United States Patent [19]

Kendel

[11] Patent Number: 5,220,319
[45] Date of Patent: Jun. 15, 1993

[54] ADAPTABLE KEY HOLDER FOR A REMOTE CONTROL TRANSMITTER

[75] Inventor: Michael L. Kendel, New Braunfels, Tex.

[73] Assignee: Motorola, Inc., Schaumburg, Ill.

[21] Appl. No.: 709,541

[22] Filed: Jun. 3, 1991

[51] Int. Cl.$^5$ .................. H04B 1/03; H04B 1/034; A44B 15/00

[52] U.S. Cl. .................. 340/825.690; 341/176; 455/128; 70/456 R; 206/37.1; D3/62

[58] Field of Search .............. 70/456 R, 456 B, 431, 70/432, 256, 257; 341/20, 176; 206/37.1–37.8, 38.1; D3/61–65; D10/60; 362/116; 340/825.69; 455/66, 95, 128; D14/155, 218

[56] References Cited

U.S. PATENT DOCUMENTS

| | | | |
|---|---|---|---|
| D. 308,758 | 6/1990 | Chien | D3/62 |
| D. 308,759 | 6/1990 | Lui | D3/63 |
| D. 319,804 | 9/1991 | Johnson et al. | D10/60 |
| 4,725,827 | 2/1988 | Gallegos, Jr. et al. | 341/20 |
| 4,769,799 | 9/1988 | Matsukage | 206/38.1 |
| 4,879,553 | 11/1989 | Righi | 340/825.69 |
| 4,931,789 | 6/1990 | Pinnow | 340/825.69 |

OTHER PUBLICATIONS

Code Alarm Vehicle Security Systems; published Nov. 1990-50; brochure for an XT Plus Remote Control Vehicle Security System.
Stanley Electronics; "Smart Things Come in Small Packages", brochure for a Micro–Code Transmitter.
Audiovox Corporation; printed 1991, brochure for PRO-9144 Remote Control Security System.
Audiovox Corporation, printed 1991 The Protector Corporation, brochure for a PRO-9146A Remote Control Security System.
Audiovox Corporation, printed 1989 Audiovox Corporation, brochure for a PRO-9149 Remote Control Security System.
Audiovox Corporation, printed 1991 Audiovox Corporation, brochure for a APS-1 Remote Auto Security System.
The Chamberlain Group, Inc., printed 1990, brochure for a Model 1160 Garage Door Opener.
Moore-O-Matic, Inc., A Nortek Company, brochure for the Delta 3 family of radio controls.
Alpine Electronics of America, Inc., printed 1990, brochure for various security systems.
Alpine Electronics of America, Inc., printed 1991, brochure for 8030B Two-Button Remote Control Security System and 8203 1-Channel Mobile Paging System.

Primary Examiner—Sandra L. O'Shea
Assistant Examiner—Andrew M. Hill
Attorney, Agent, or Firm—Phillip H. Melamed; John H. Moore

[57] ABSTRACT

The present invention provides an adaptable key holder for a remote control transmitter. This includes a remote control transmitter (101) with buttons (102) for activating functions typically located on one surface, and a detachable ring (200) encompassing the remote control transmitter (101) and having a feature to captivate keys (105). This captivating feature (105) feature can be oriented either adjacent or opposite the most used transmitter button.

10 Claims, 2 Drawing Sheets

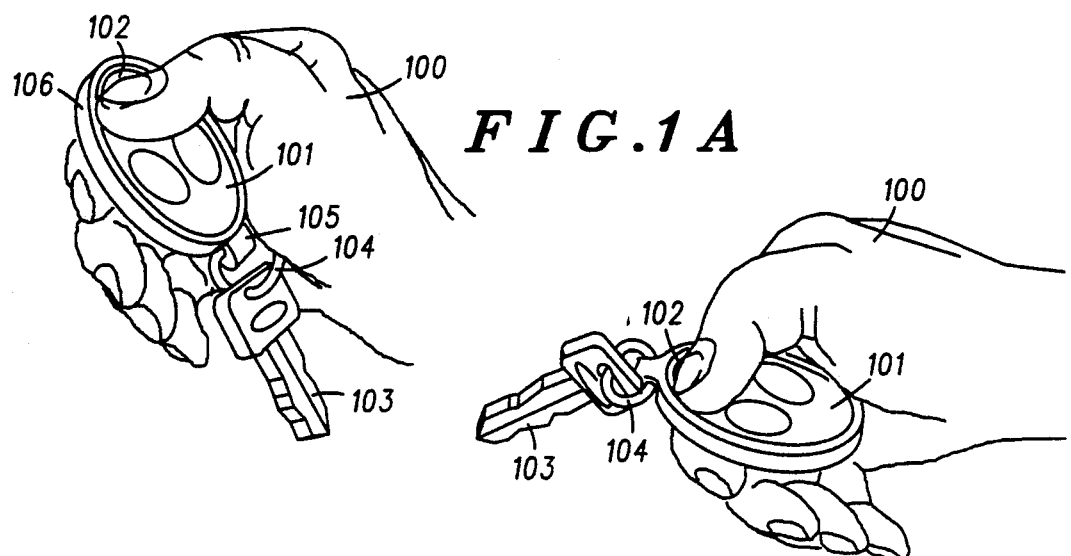
FIG.1A
FIG.1B
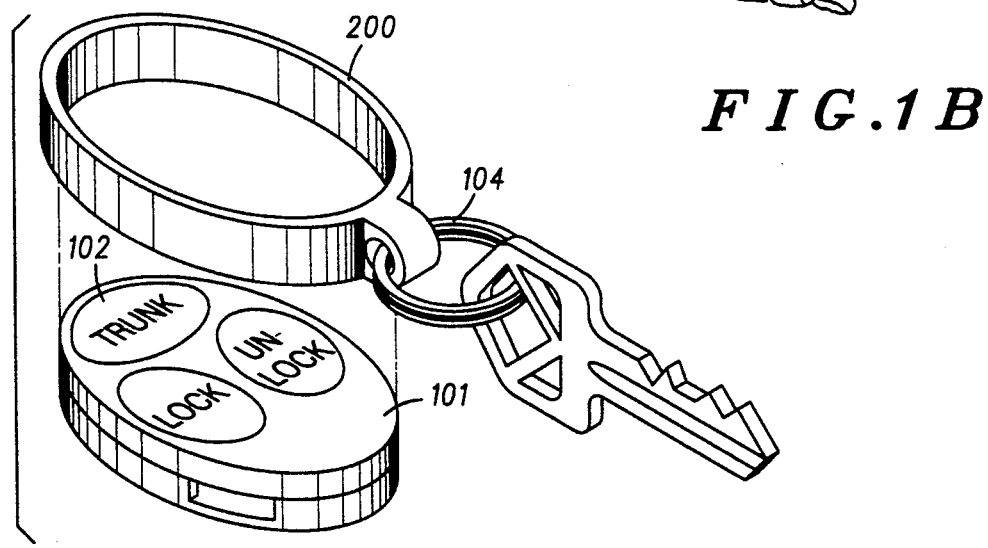
FIG.2A
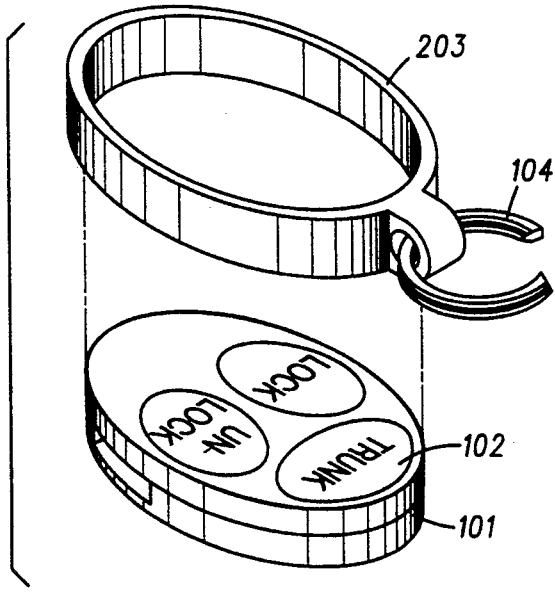
FIG.2B

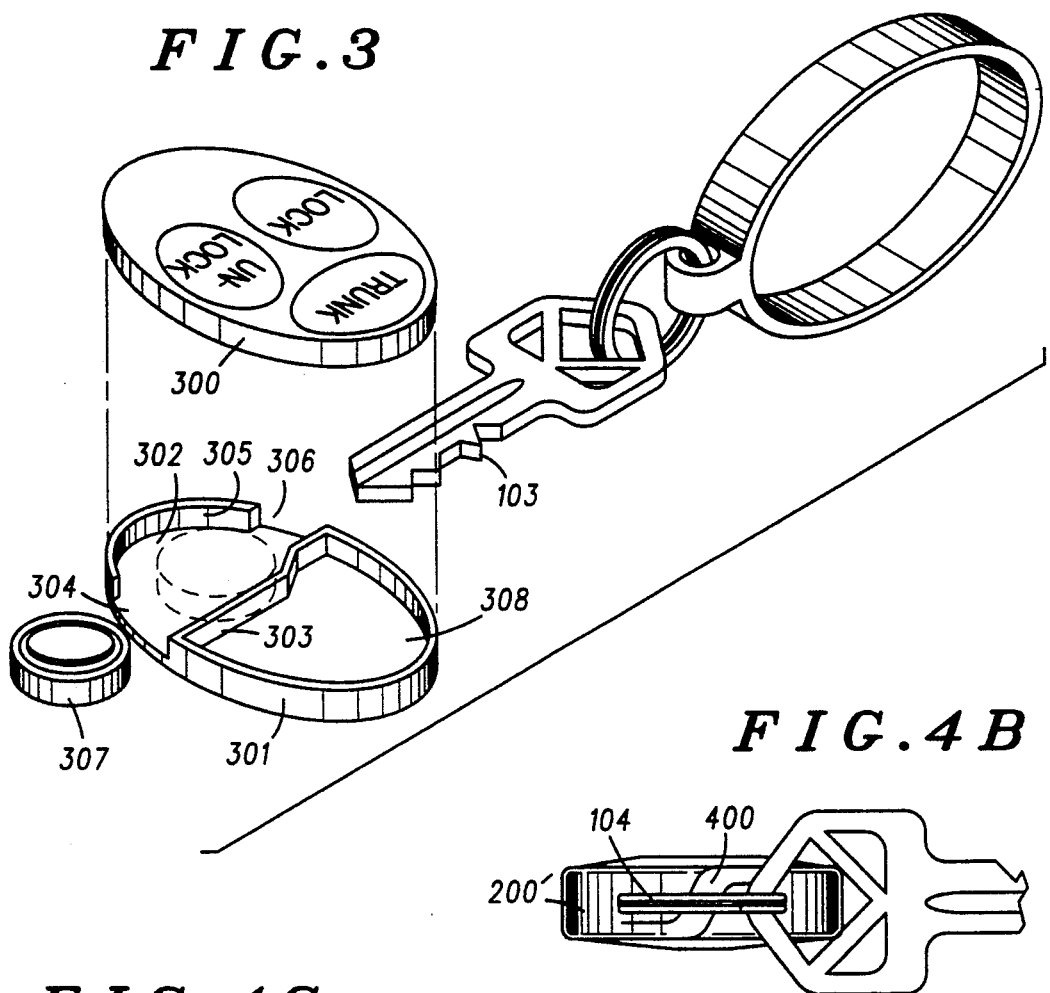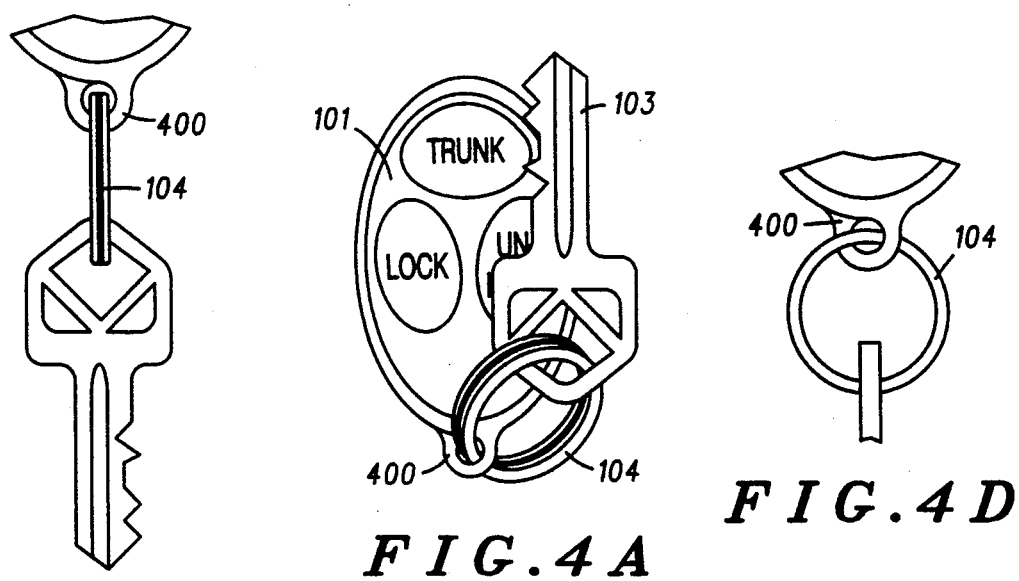

ADAPTABLE KEY HOLDER FOR A REMOTE CONTROL TRANSMITTER

FIELD OF THE INVENTION

This invention relates generally to remote control devices, and specifically to such devices as applied in remote control transmitter applications.

BACKGROUND OF THE INVENTION

Remote control devices which have a feature to captivate keys are well known. Typically they are designed for use in automotive related remote control systems. This includes, but is not limited to automotive remote starters, alarm systems, and garage door openers.

These devices generally fall into two categories. The first having functions including provision for remotely starting the car, locking the doors, setting off a panic alarm, and opening the car's trunk. Representative devices include those offered by Alpine Electronics of America, Inc., 19145 Gramercy Place, Torrance, CA 90501. The second category is remote control garage door openers such as the Micro-Code Transmitter from Stanley Electronics, 22700 Helslip Drive, Novi, MI 48050.

Although versatile, these current products suffer from several deficiencies. These include, a fixed key ring location making it cumbersome for some people to access the most frequently used button, a bulky presence in the person's pocket, exposure of the integral micro-electronics while changing the battery, and a cumbersome to manufacture packaging scheme for sealing the product from moisture in order to protect the microelectronics content of the transmitter.

SUMMARY OF THE INVENTION

The present invention encompasses an adaptable key holder for a remote control transmitter. This includes a remote control transmitter with buttons for activating functions typically located on one surface of the transmitter housing, and a detachable ring encompassing the transmitter housing and having a feature to captivate keys. This captivating feature can be oriented either adjacent or opposite the most used transmitter button.

BRIEF DESCRIPTION OF THE DRAWINGS

The present invention will be effectively comprehended when read with the aid of the accompanying drawings in which:

FIG. 1A and FIG. 1B highlight the adaptable position of the key holder employing the present invention in two orientations in a person's hand.

FIG. 2A and FIG. 2B shows the adaptable positioning of the key holder employing the present invention in two orientations.

FIG. 3 shows the battery replacement feature.

FIG. 4A shows a benefit of the structure of the elongated portion of the ring.

FIG. 4B shows a side view of the elongated portion of the ring.

FIG. 4C shows the key ring in a first orientation allowed by the elongated portion of the ring.

FIG. 4D shows the key ring in a second orientation allowed by the elongated portion of the ring.

DETAILED DESCRIPTION OF A PREFERRED EMBODIMENT

An adaptable key holder for a remote control transmitter in a remote keyless entry system is described as a preferred embodiment. In an alternative embodiment these improvements could be applied to other remote control devices such as those applied in garage door opener systems, or automotive alarm systems.

FIG. 1A shows a person's hand 100 holding a remote control transmitter 101 in a preferred orientation between the most frequently accessed button 102 and the key 103 connected by the key ring 104 attached through the hole in the elongated portion 105 of the removeable ring 106. This person would desire to pickup this device in this orientation based on what felt comfortable to him. Thus the most frequently accessed button is cued by the position of the key 103. Other persons prefer an alternative orientation of the most frequently accessed button 102 and the key 103 as illustrated in FIG. 1B. In the preferred embodiment a trunk release button is featured as the most frequently accessed button 102. In an alternative embodiment a different function could be assigned to the most frequently accessed button 102.

FIG. 2A and FIG. 2B illustrate a unique reorientation mechanism. In the preferred embodiment the removeable ring 200 is fabricated of a thermoplastic elastomer that not only is easily removeable but provides a moisture seal around the remote control transmitter 101 as it grips the remote control transmitter's 101 exterior edge. This design approach offers an elegantly simple means for manufacturing a robust sealing mechanism. To reorient the remote control transmitter 101 one simply peels off the removeable ring 200 and drops out the remote control transmitter 101 and rotates the remote control transmitter 101 to another preferred orientation as shown in FIG. 2B before recapture by the removeable ring 200.

In FIG. 3 we find the remote control transmitter's housing sectioned into two parts 300 and 301 in order to illustrate the feature preventing exposure of the integral microelectronics while changing the battery 307. Referencing the lower housing element 301 we find it partitioned into a battery compartment 302 by an interior wall 303, a battery exit hole 304, the remote control transmitter housing periphery 305 and the battery remover entrance hole 306. Once the housing elements 300 and 301 are ultrasonically welded user access to the microelectronics compartment 308 is prohibited by the interior wall 303. When the battery 307 is depleted one can use the key 103 or another device to push the battery 307 out of the housing 300 and 301 by inserting the remover through the battery remover entrance hole 306 and forcing the battery 307 out the battery exit hole 304.

FIG. 4 illustrates a feature that reduces the bulky presence in the person's pocket. FIG. 4A shows that the key 103 rests flatly on the remote control transmitter 101. This is due to the unique geometry of the key ring 104 capturing feature 400. FIG. 4B illustrates an end view of the removeable ring 200' and the attendant elongated portion with a hole 400. FIG. 4C and FIG. 4D show the extremes of travel for the key ring element 104 with relationship to the elongated portion with a hole 400 illustrating the flexibility of the design. This feature allows the key to lie flat against the remote control transmitter, by allowing the key ring to rotate from horizontal to vertical or find any orientation in between. This capturing feature also allows the removeable ring 200' to be tooled without side action slides making the tool and resulting removeable ring 200' more cost effective.

What is claimed is:

1. An adaptable key holder for a remote control transmitter comprising:
    a remote control transmitter having a housing with at least one bounded external surface;
    at least one button disposed on said at least one bounded external surface; and
    a detachable ring disposed about the periphery of said remote control transmitter housing and encircling said housing, said detachable ring including an elongated portion disposed away from said housing, the elongated portion having a void disposed therethrough, wherein said ring and housing are constructed such that said ring is disposed in either of two positions wherein said button is oriented either adjacent or opposite said elongated portion.

2. An adaptable key holder for a remote control transmitter in accordance with claim 1 further comprising means for partitioning an interior volume of said remote control transmitter housing into a plurality of compartments wherein one of said plurality of compartments is formed by an interior wall and said remote control transmitter housing periphery, said remote control transmitter housing periphery having two holes disposed therein and each hole extending from opposite exterior surfaces of said remote control transmitter housing periphery to said one of said plurality of compartments.

3. An apparatus in accordance with claim 1 wherein said housing is partitioned into a battery compartment and a microelectronics compartment, wherein said compartments are separated by an interior wall.

4. An apparatus in accordance with claim 3 wherein said housing is sectioned into two elements, junctioned essentially on a plane parallel to said at least one bounded external surface to form a singular housing.

5. An apparatus in accordance with claim 4 wherein said at least one bounded external surface further comprises an exterior edge located perpendicular to said plane, and wherein said detachable ring is located annularly surrounding the exterior edge.

6. An apparatus in accordance with claim 5 wherein said battery compartment further comprises a battery exit hole extending from said battery compartment to the exterior edge, and a battery remover entrance hole extending from said battery compartment to the exterior edge located opposite the battery exit hole.

7. An apparatus in accordance with claim 6 wherein the battery exit hole is larger than the battery remover entrance hole.

8. An apparatus in accordance with claim 7 wherein said detachable ring is comprised of a thermoplastic elastomer for providing a moisture seal around the exterior edge of said housing.

9. An apparatus in accordance with claim 8 wherein the void disposed through the elongated portion of said detachable ring and its void have a geometry such that a key ring can be disposed therethrough either perpendicular or parallel to the exterior edge.

10. An apparatus in accordance with claim 1 wherein said at least one bounded external surface further comprises an exterior edge, and wherein said detachable ring provides a moisture seal located annularly surrounding the exterior edge of said housing.

* * * * *